United States Patent
Tsuda et al.

(10) Patent No.: US 9,889,900 B2
(45) Date of Patent: Feb. 13, 2018

(54) SCREEN MOVING DEVICE IN SADDLE-RIDE-TYPE VEHICLE

(71) Applicant: HONDA MOTOR CO., LTD., Tokyo (JP)

(72) Inventors: Haruka Tsuda, Wako (JP); Ippei Kawamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 15/053,886

(22) Filed: Feb. 25, 2016

(65) Prior Publication Data

US 2016/0251049 A1 Sep. 1, 2016

(30) Foreign Application Priority Data

Feb. 27, 2015 (JP) .................................. 2015-038779

(51) Int. Cl.
  *B62J 17/04* (2006.01)
(52) U.S. Cl.
  CPC ..................... *B62J 17/04* (2013.01)
(58) Field of Classification Search
  CPC ........................................................ B62J 17/04
  USPC ........................................................ 296/78.1
  See application file for complete search history.

(56) References Cited

U.S. PATENT DOCUMENTS

| | | | | | |
|---|---|---|---|---|---|
| 4,489,973 | A | * | 12/1984 | Willey | B62J 17/04 296/78.1 |
| 4,707,017 | A | * | 11/1987 | Minobe | B62J 17/00 296/78.1 |
| 5,732,965 | A | * | 3/1998 | Willey | B62J 17/04 180/219 |
| 6,709,042 | B2 | * | 3/2004 | Takemura | B62J 17/04 296/78.1 |
| 6,736,441 | B1 | * | 5/2004 | Barber | B62J 17/04 248/549 |
| 7,044,530 | B1 | * | 5/2006 | Hahne | B62J 17/04 296/78.1 |
| 7,090,280 | B2 | * | 8/2006 | Willey | B62J 17/04 224/413 |
| 2002/0041107 | A1 | * | 4/2002 | Takemura | B62J 17/04 296/78.1 |

(Continued)

FOREIGN PATENT DOCUMENTS

| | | | | | |
|---|---|---|---|---|---|
| CA | 2921450 | A1 | * | 8/2016 | ............. B62J 17/04 |
| DE | 10065131 | A1 | * | 7/2002 | ............. B62J 17/04 |

(Continued)

*Primary Examiner* — H Gutman
(74) *Attorney, Agent, or Firm* — Westerman, Hattori, Daniels & Adrian, LLP

(57) ABSTRACT

Vertical movement of support members disposed on both left and right sides of a screen are guided by a pair of left and right fixed rail brackets. A manipulation lever manually operable so as to vertically move the screen and connected to at least one of the pair of support members includes a lever main portion which is rotatably supported on at least one of the pair of rail brackets and is connected to one of the support members, and a grip which is connected to the lever main portion. The grip is connected to the lever main portion such that the grip is operable between a projecting position where the grip projects from the lever main portion and a storage position where the grip is folded toward a lever main portion side.

13 Claims, 13 Drawing Sheets

(56) References Cited

U.S. PATENT DOCUMENTS

| | | | |
|---|---|---|---|
| 2009/0189413 A1* | 7/2009 | Misaki | B62J 17/04 296/180.1 |
| 2009/0195011 A1* | 8/2009 | Tsuda | B62J 17/04 296/78.1 |
| 2013/0099521 A1* | 4/2013 | Kato | B62J 17/04 296/78.1 |
| 2014/0084619 A1 | 3/2014 | Willey | |
| 2016/0288854 A1* | 10/2016 | Hagimoto | B62J 17/04 |

FOREIGN PATENT DOCUMENTS

| | | | | |
|---|---|---|---|---|
| EP | 0685385 A1 * | 12/1995 | ............. | B62J 17/04 |
| EP | 1752367 A2 * | 2/2007 | ............. | B62J 17/04 |
| EP | 2374700 A1 * | 10/2011 | ............. | B62J 17/04 |
| EP | 2711274 A2 * | 3/2014 | ............. | B60J 1/025 |
| GB | 733208 A * | 7/1955 | ............. | B62J 17/04 |
| JP | 2010070108 A * | 4/2010 | | |
| JP | 2014-28591 A | 2/2014 | | |
| JP | 2016159717 A * | 9/2016 | ............. | B62J 17/04 |

* cited by examiner

SCREEN MOVING DEVICE IN SADDLE-RIDE-TYPE VEHICLE

TECHNICAL FIELD

The present disclosure relates to a saddle-ride-type vehicle where a wind shield screen is arranged in front of a steering handle in a vertically movable manner, and more particularly to an improvement in a screen moving device.

BACKGROUND

In Patent Literature 1 (Japanese Unexamined Patent Application Publication No. 2014-028591), there has been known a motorcycle where a screen arranged in front of a steering handle is vertically moved by an electrically operated motor.

SUMMARY

In the case where the screen is driven by the electrically operated motor as disclosed in the above-mentioned Patent Literature a power transmission mechanism constituted of a drum, a pulley, a cable and the like becomes necessary and hence, a screen moving device becomes complicated and expensive. On the other hand, it may be possible to vertically drive a screen by a manipulation of a manipulation lever by a vehicle user without using an electrically operated motor. In this case, to enhance manipulating property by reducing a force necessary for manipulating the manipulation lever, it is desirable to increase a length of the manipulation lever as much as possible. However, when only the elongation of the manipulation lever is adopted, the screen moving device becomes large-sized thus giving rise to a possibility that parts around the manipulation lever are adversely affected and also giving rise to a possibility that a field of view of an occupant is affected during driving.

Accordingly, it is necessary to make the moving device as compact as possible and hence, the elongation of the manipulation lever is restricted to some extent whereby the enhancement of manipulating property is limited.

The present disclosure has been made in view of the above-mentioned circumstances, and it is desirable to provide a screen moving device in a saddle-ride-type vehicle which can move a screen vertically in response to the manipulation of a manipulation lever- and can be made compact while enhancing manipulating property.

The first technical feature of the present disclosure lies in a saddle-ride-type vehicle where a wind shield screen is arranged in front of a steering handle in a vertically movable manner, wherein the screen moving device includes: support members disposed on both left and right sides of the screen respectively; a pair of left and right fixed rail brackets provided for guiding the support members in a vertically movable manner; and a manipulation lever connected to at least one of the pair of support members so as to enable a manual manipulation which moves the screen vertically, wherein the manipulation lever includes: a lever main portion which is rotatably supported on at least one of the pair of rail brackets and is connected to at least one of the support members; and a grip which is connected to the lever main portion and is capable of being gripped by a vehicle user, and the grip is connected to the lever main portion in a state where the grip is operable between a projecting position where the grip projects from the lever main portion and a storage position where the grip is folded toward a lever main portion side.

The second technical feature of the present disclosure lies in that, in addition to the configuration according to the first technical feature, the manipulation lever is rotatably supported on the left rail bracket out of the pair of left and right rail brackets.

The third technical feature of the present, disclosure lies in that, in addition to the configuration according to the first or second technical feature, a meter unit which displays vehicle information is arranged between the pair of left and right support members, and the grip is connected to the lever main portion in a state where the grip is folded toward an outside in a vehicle width direction from the lever main portion in the storage position.

The fourth technical feature of the present disclosure lies in that, in addition to any one of the configurations according to the first to third technical features, both end portions of a connecting member which connects the pair of left and right support members are rotatably connected to the pair of left and right rail brackets, a guide hole which guides the support member along a moving trajectory of the screen is formed in the rail bracket, and a screen biasing spring which biases the screen upward is disposed between the rail bracket and the connecting member.

The fifth technical feature of the present disclosure lies in that, in addition to the configuration according to the fourth technical feature, the guide hole formed in the rail bracket is formed in an extending manner in a curved shape, an elongated hole extending in a direction which intersects with the guide hole is formed in the lever main portion, and a guide projecting portion formed on the support member in a projecting manner is configured to pass through the guide hole and the elongated hole.

The sixth technical feature of the present disclosure lies in that, in addition to any one of the configurations according to the first to fifth technical features, a wall thickness reducing hole is formed in the grip.

The seventh technical feature of the present disclosure lies in that, in addition to any one of the configurations according to the first to sixth technical features, relative positions of the rail bracket and the manipulation lever are set such that the grip disposed at the storage position is arranged behind at least one of the rail brackets.

Further, the eighth technical feature of the present disclosure lies in that, in addition to any one of the configurations according to the first to seventh technical features, a plurality of engaging recessed portions individually corresponding to a plurality of vertical positions of the screen are formed on at least one of the rail brackets, and a locking member which is configured to selectively engage with the plurality of engaging portions corresponding to folding of the grip into the storage position is housed in the inside of the lever main portion.

According to the first technical feature, the manipulation lever which is manually manipulated by a vehicle user so as to vertically move the screen includes: the lever main portion; and the grip which is connected to the lever main portion and is capable of being gripped by a vehicle user, and the grip is operable between the projecting position where the grip projects from the lever main portion and the storage position where the grip is folded toward a lever main portion side. Accordingly, the screen can be vertically moved by manipulating the long manipulation lever in a state where the grip assumes a projecting position and hence, a force necessary for manipulating the manipulation lever can be reduced whereby the manipulating property of the manipulation lever can be enhanced. Further, by folding the grip to the storage position on a lever main portion side after the grip is manipulated so as to move the screen, the moving device including the manipulation lever can be made compact.

According to the second technical feature, the manipulation lever is rotatably supported on the left rail bracket. Accordingly, even when the manipulation lever is manipulated in a state where the steering handle is steered to a left side for locking a handle bar at the time of parking, the manipulation lever minimally interferes with the steering handle and hence, the manipulating property of the manipulation lever can be enhanced.

According to the third technical feature, while the meter unit is arranged between the pair of left and right support portions, the grip at the storage position falls toward the outside in a vehicle width direction from the lever main portion. By arranging the grip at the storage position at a position where the grip does not overlap with the meter unit, there is no possibility that a vehicle user erroneously manipulates a button arranged on the meter unit at the time of manipulating the grip toward a projecting position side and hence, the manipulating property of the manipulation lever can be enhanced.

According to the fourth technical feature, both end portions of the connecting member which connects the pair of left and right support members are rotatably connected to the rail bracket, and the screen is resiliently biased upward by the screen biasing spring disposed between the rail bracket and the connecting member. Accordingly, a manipulating force necessary for moving the screen upward can be reduced whereby the screen can be easily moved upward with a small manipulating force.

According to the fifth technical feature, the guide hole is formed in the rail bracket in a curved shape, the elongated hole is formed in the lever main portion in an extending manner in a direction which intersects with the guide hole, and the guide projecting portion on a support member side is configured to pass through the guide hole and the elongated hole. Accordingly, the screen can be moved such that the screen draws an appropriate trajectory without increasing a size of the manipulation lever and hence, large sizing of the manipulation lever can be suppressed whereby the moving device can be simplified.

According to the sixth technical feature, the wall thickness reducing hole is formed in the grip. Accordingly, a vehicle user can easily grip the grip and hence, the screen can be moved with a small force.

According to the seventh technical feature, the grip disposed at the storage position is disposed behind the rail bracket which supports the manipulation lever. Accordingly, the moving device including the manipulation lever can be made compact and can be simplified.

According to the eighth technical feature, the locking member which is operated corresponding to folding of the grip to the storage position is selectively engaged with the plurality of engaging recessed portions formed on the rail bracket. Accordingly, the screen can be held at an arbitrary vertical position with the compact configuration having small number of parts.

DETAILED DESCRIPTION

Although the following embodiments are explained with reference to attached drawings, in the explanation made hereinafter, directions of "front", "rear", "left", "right", "up" and "down" are equal to the directions as viewed from an occupant seated on a motorcycle.

Figure 1:
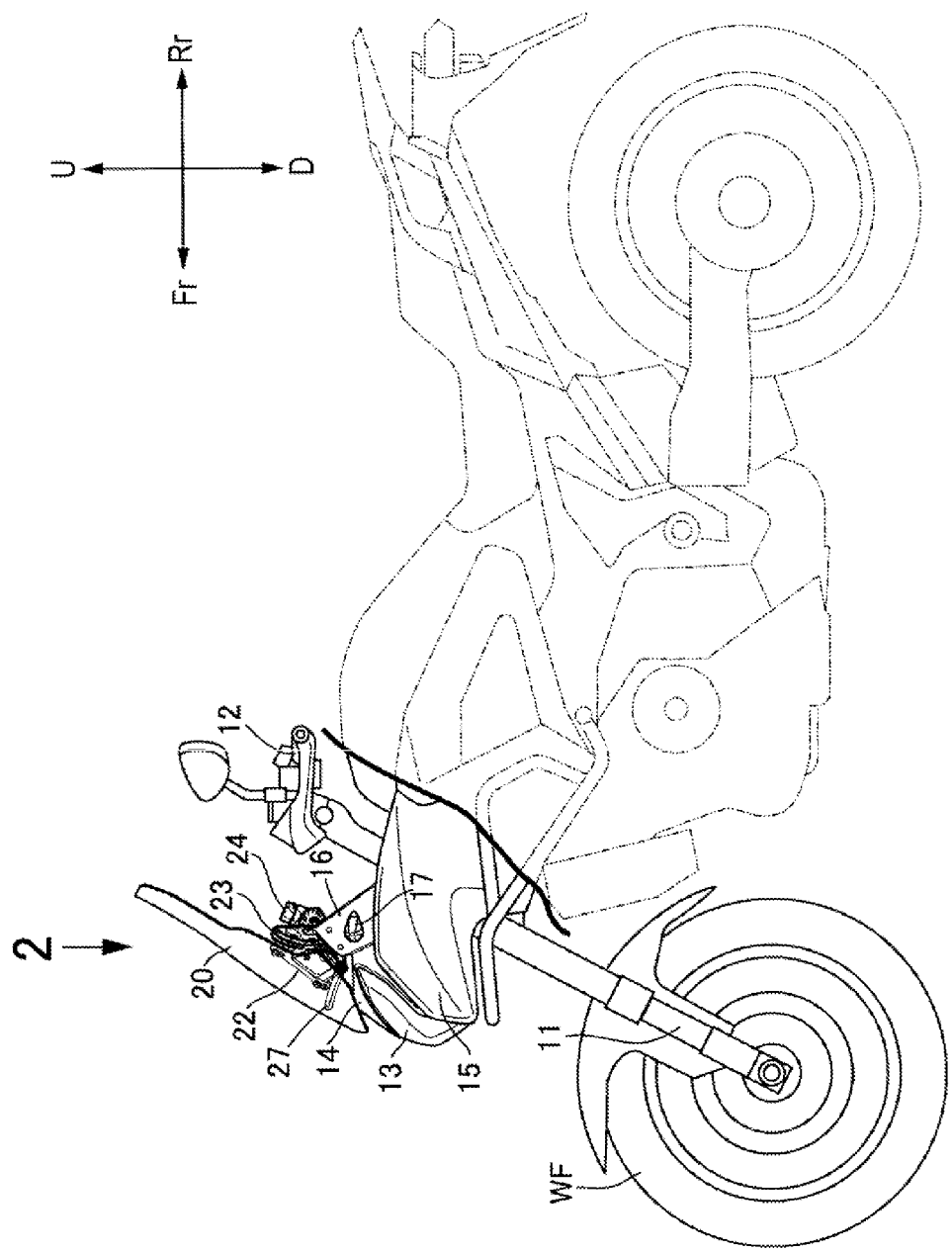
FIG. 1 is a left side view of a motorcycle according to a first embodiment.

Firstly, in FIG. 1, at a front portion of a motorcycle which is a saddle-ride-type vehicle, a front fork 11 pivotally supporting a front wheel WF and a steering handle 12 connected to the front fork 11 are arranged in a steerable manner. A headlight 13 and a headlight cover 14 which covers the headlight 13 are arranged in front of the front fork 11 and the steering handle 12.

Figure 2:
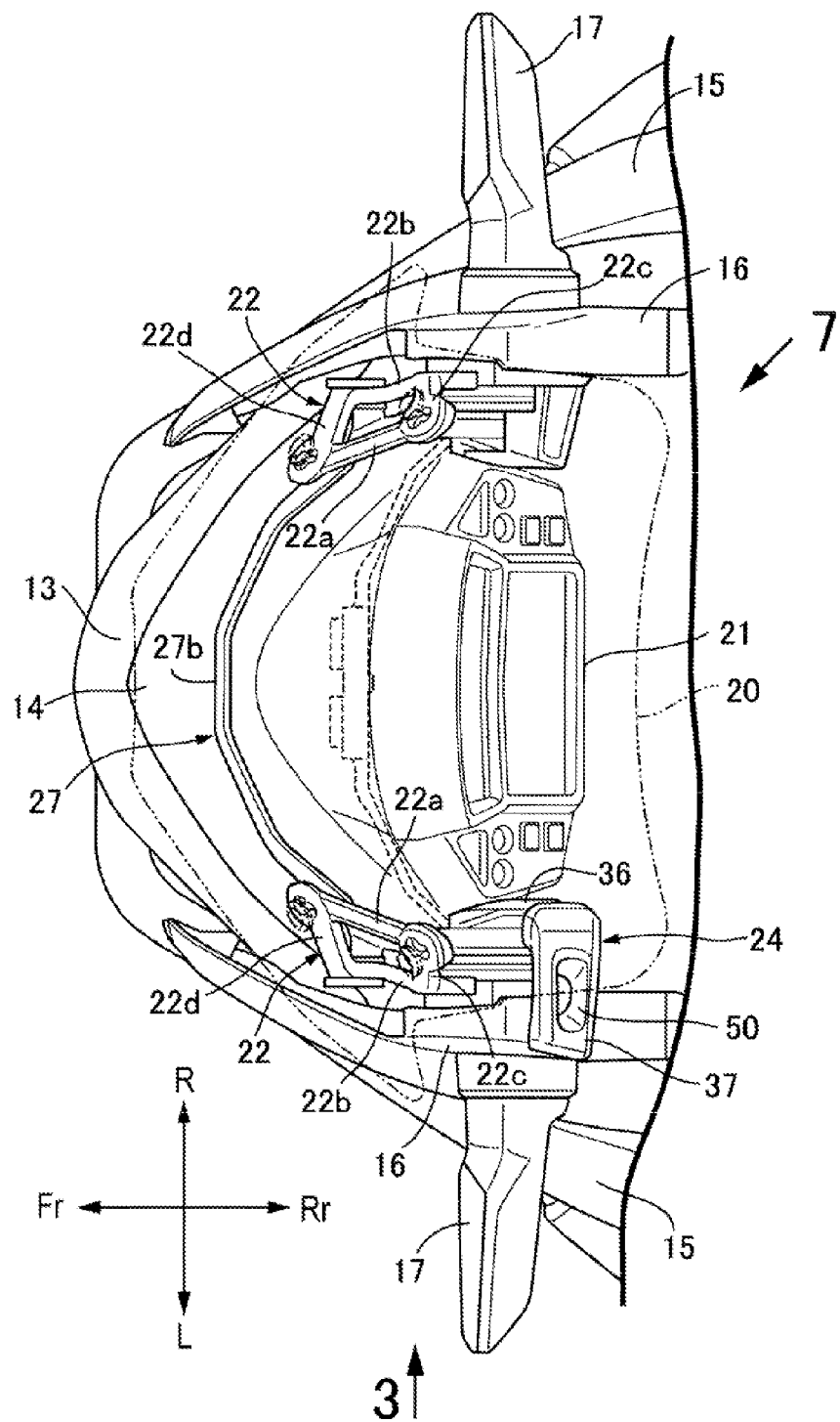
FIG. 2 is a plan view showing an essential part of the motorcycle as viewed in the direction indicated by an arrow 2 in FIG. 1.

To explain this embodiment also with reference to FIG. 2, a pair of left and right side cowls 15 which covers a portion of the front fork 11 and a portion of the steering handle 12 from sideward directions is arranged on both sides of the headlight cover 14. A pair of left and right cowl support stays 16 which is fixed to a front portion of a vehicle body frame not shown in the drawing is arranged in an upwardly projecting manner from front upper ends of the pair of left and right side cowls 15, and a blinker 17 is mounted on the cowl support stays 16 respectively.

To explain this embodiment also with reference to FIG. 3 to FIG. 7, both end portions of a connecting frame 18 are fastened to the pair of left and right cowl support stays 16 such that each end portion is fastened by a pair of first screw members 19. The headlight 13 is supported on the connecting frame 18.

A wind shield screen 20 which is movable in the vertical direction is arranged above the headlight 13 and in front of the steering handle 12. Support members 22 which are arranged in left and right symmetry are fastened to lower portions of the screen 20 on both left and right sides of the screen 20 respectively. A meter unit 21 which displays vehicle information is supported on the connecting frame 18 such that the meter unit 21 is arranged between the pair of left and right support members 22 as well as between the screen 20 and the steering handle 12, and the meter unit 21 is arranged above the connecting frame 18.

The support member 22 is an integral body formed of: a first vertical frame portion 22a which extends in the vertical direction such that both upper and lower end portions of the first vertical frame portion 22a are fastened to the screen 20; a second vertical frame portion 22b which extends in the vertical direction outside the first vertical frame portion 22a in the vehicle width direction; an upper lateral frame portion 22c which connects an upper end portion of the second vertical frame portion 22b and an upper portion of the first vertical frame portion 22a to each other; and a lower lateral frame portion 22d which connects a lower end portion of the second vertical frame portion 22b and a lower portion of the first vertical frame portion 22a to each other.

The movement of the support members 22 of the screen 20 in the vertical direction on both left and right sides is guided by a pair of left and right fixed rail brackets 23 which is formed in left and right symmetry. A manipulation lever 24 which is manually operable to move the screen 20 in the vertical direction is connected to at least one of the pair of left and right support members 22. In this embodiment, the manipulation lever 24 is connected to the left support member 22.

The rail brackets 23 are arranged inside the cowl support stays 16 in the vehicle width direction. The rail bracket 23 is fastened to the cowl support stay 16 using a first bolt 25 and a second bolt 26 which is disposed at a position away from the first bolt 25 in an obliquely rearward and upward direction. A connecting member 27 which extends in the vehicle width direction behind a lower portion of the screen 20 is connected to the lower end portions of the second vertical frame portions 22b of the pair of left and right support members 22 in a rotatable manner using a second screw member 28 respectively, and both end portions of the connecting member 27 in the longitudinal direction are connected to the pair of left and right rail brackets 23 in a rotatable manner respectively.

The connecting member 27 is an integral body formed of a pair of left and right support arm portions 27a which is arranged inside the rail brackets 23 in the vehicle width direction and extends in the fore-and-aft direction, and a bridge portion 27b which extends in the vehicle width direction behind the lower portion of the screen 20 and connects front end portions of the pair of left and right support arm portions 27a to each other. Both end portions of the connecting member 27 in the longitudinal direction, that is, rear end portions of the support arm portions 27a are connected to the rail brackets 23 in a rotatable manner about a first rotation axis C1, and front end portions of the support arm portions 27a which are intermediate portions of the connecting member 27 in the longitudinal direction are connected to the lower end portion of the second vertical frame portion 22b of the support member 22 in a rotatable manner about a second rotation axis C2 arranged in front of the first rotation axis C1, that is, an axis of the second screw member 28.

Figure 8:
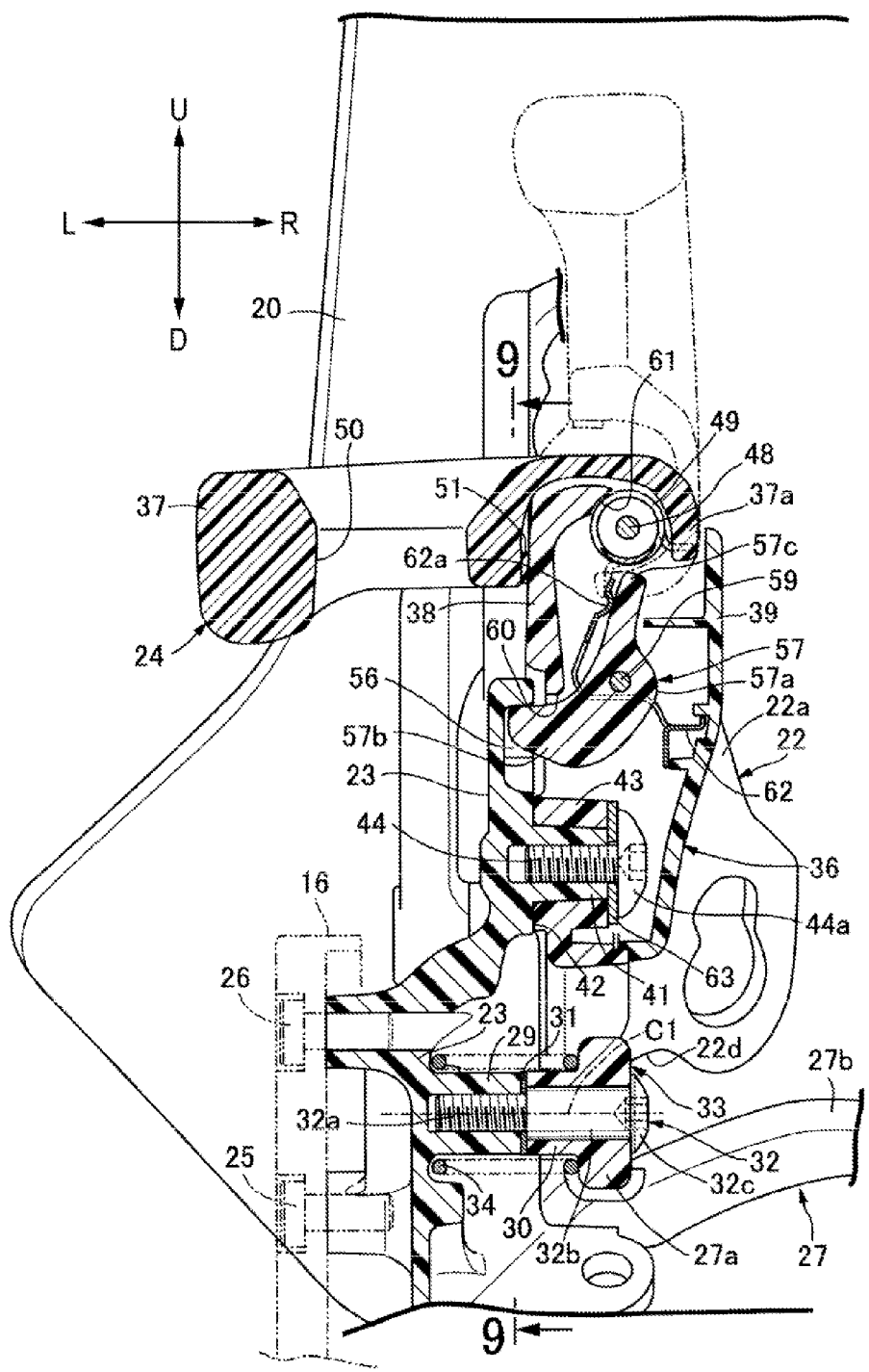
FIG. 8 is a cross-sectional view taken along a line 8-8 in FIG. 4.

To explain this embodiment also with reference to FIG. 8, a circular cylindrical first boss portion 29 which is arranged coaxially with the first rotation axis C1 is integrally formed on the rail bracket 23 in a projecting manner below the second bolt 26. On the other hand, a first support sleeve portion 30 which projects toward the first boss portion 29 is integrally formed on a rear end portion of the support arm portion 27a of the connecting member 27 in a projecting manner. A first washer 31 is interposed between the first boss portion 29 and the first support sleeve portion 30. A third screw member 32 which is made to pass through the connecting member 27, the first support sleeve portion 30 and the first washer 31 is threadedly engaged with the first boss portion 29 coaxially with the first rotation axis C1. The third screw member 32 is an integral body formed of: a threaded shaft portion 32a which is threadedly engaged with the first boss portion 29; a rod-like large diameter shaft portion 32b which is formed with a diameter larger than that of the threaded shaft portion 32a and is continuously and coaxially formed with the threaded shaft portion 32a in a state where one end portion of the large diameter shaft portion 32b is brought into contact with the first washer 31; and an enlarged diameter head portion 32c which is continuously and coaxially formed with the other end portion of the large diameter shaft portion 32b on a side opposite to the rail bracket 23 in a state where the enlarged diameter head portion 32c is brought into contact with an outer surface of an end portion of the connecting member 27. An end portion of the connecting member 27 is rotatably supported on the large diameter shaft portion 32b of the third screw member 32 which is threadedly engaged with the first boss portion 29.

Figure 9:
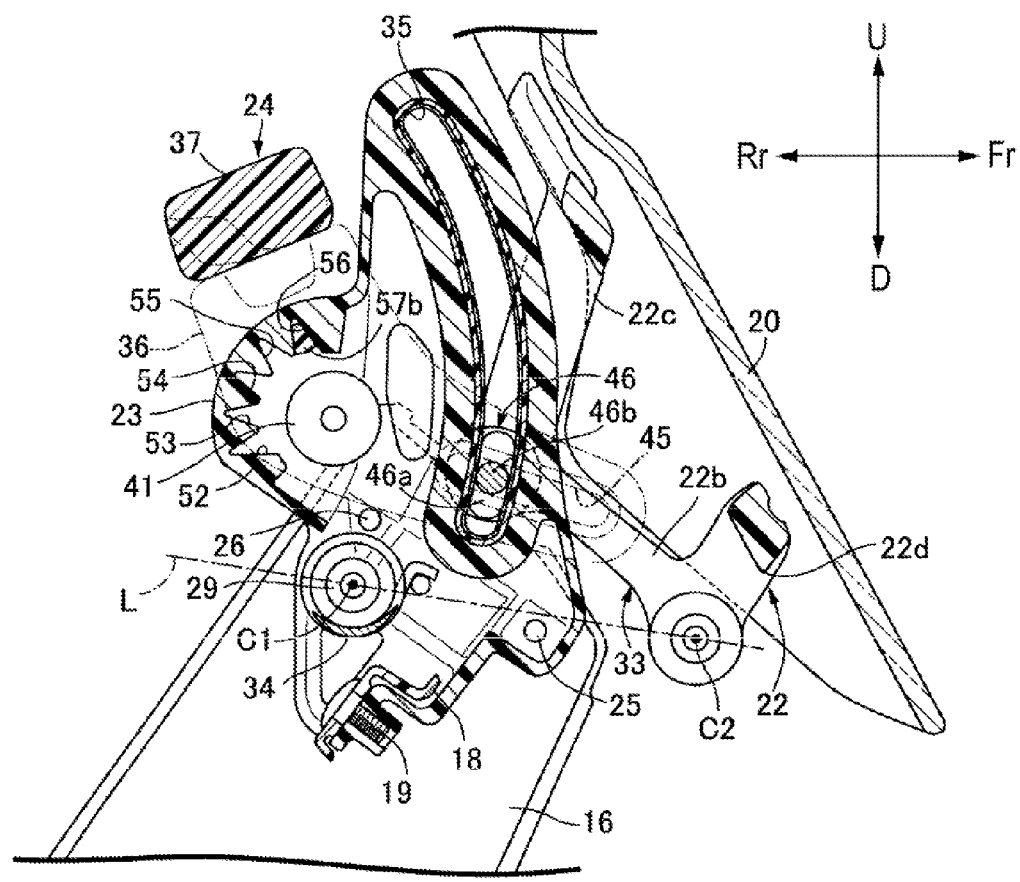
FIG. 9 is a cross-sectional view taken along a line 9-9 in FIG. 8.

To explain this embodiment also with reference to FIG. 9, a first torsion spring 34 which is a screen biasing spring for biasing the screen 20 upward is disposed between the rail bracket 23 and the connecting member 27 in a state where the first torsion spring 34 surrounds the first boss portion 29 and the first support sleeve portion 30. A guide hole 35 which guides the support member 22 along a moving trajectory of the screen 20 is formed in the rail bracket 23 such that the guide hole 35 extends in a curved shape.

Figure 10:
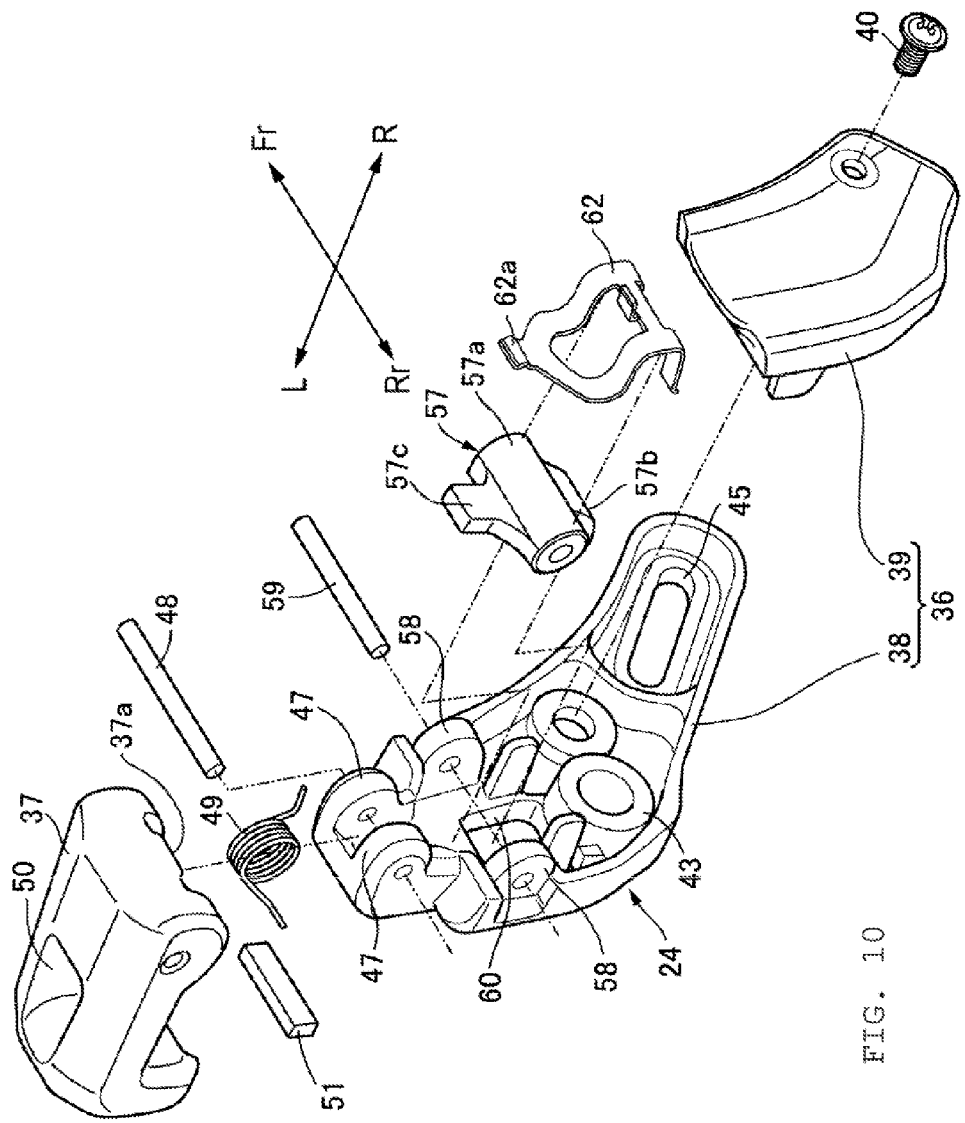
FIG. 10 is an exploded perspective view of a manipulation lever.

To explain this embodiment also with reference to FIG. 10, the manipulation lever 24 is constituted of: a lever main portion 36 which is supported on the left rail bracket 23 out of the pair of left and right rail brackets 23 in a rotatable manner and is connected to the left support member 22; and a grip 37 which is connected to the lever main portion 36 in a state where a vehicle user can grip the grip 37. The grip 37 is connected to the lever main portion 36 such that the grip 37 is operable between a projecting position (position indicated by a solid line in FIG. 11) where the grip 37 projects from the lever main portion 36 and a storage position (a position indicated by a solid line in FIG. 2 to FIG. 9) where the grip 37 is folded toward a lever main portion 36 side. In the projecting position, the grip 37 is in an upright state, and, in the storage position, the grip 37 is fallen sidewise by pivot action and in a lying state.

The lever main portion 36 is constituted of: a lever body 38 which is supported on the left rail bracket 23 in a rotatable manner; and a cover member 39 which is fastened to the lever body 38 using a fourth screw member 40 so as to cover a portion of the lever body 38 from the inside in the vehicle width direction.

A circular cylindrical second boss portion 41 is integrally formed on the left rail bracket 23 in a projecting manner above the second bolt 26, and an annular receiving surface 42 which surrounds a proximal end portion of the second boss portion 41 is formed on the left rail bracket 23. On the other hand, a circular cylindrical second support sleeve portion 43 in which the second boss portion 41 is fitted is integrally formed on the lever body 38 such that one end portion of the second support sleeve portion 43 is brought into slide contact with the receiving surface 42. A fourth screw member 44 having an enlarged diameter head portion 44a is threadedly engaged with the second boss portion 41 with a second washer 63 interposed between the enlarged diameter head portion 44a and the other end portion of the second support sleeve portion 43. Due to such a configuration, the lever body 38, that is, the lever main portion 36 is supported on the left rail bracket 23 in a rotatable manner about an axis of the second boss portion 41.

The connecting member 27 which is connected to the rail bracket 23 in a rotatable manner about the first rotation axis C1 is connected to the support member 22 in a rotatable manner about the second rotation axis C2 arranged in front of the first rotation axis C1. With such a configuration, the manipulation lever 24, the connecting member 27 and the support member 22 form a link mechanism 33 where the connecting member 27 is rotatable in response to a manipulation of the manipulation lever 24 by way of the support member 22.

An elongated hole 45 which extends linearly in the direction intersecting with the guide hole 35 formed in the rail bracket 23 and having a curved shape is formed in the lever body 38. On the other hand, a guide projecting portion 46 which is arranged above a straight line L which connects the first and second rotation axes C1, C2 to each other is formed on an upper end portion of the second vertical frame portion 22b of the left support member 22 in a projecting manner, and the guide projecting portion 46 is made to pass through the elongated hole 45 in a state where the guide projecting portion 46 is fitted in the guide hole 35 in a slidable manner.

In this embodiment, the guide projecting portion 46 is formed of: a slide portion 46a which is formed in an elongated manner along the longitudinal direction of the guide hole 35 and slides in the inside of the guide hole 35; and a pin portion 46b which slides in the inside of the elongated hole 45, and the guide projecting portion 46 is fastened to the support member 22. Reversely, the guide projecting portion 46 may be formed of: a slide portion which is formed in an elongated manner along the longitudinal direction of the elongated hole 45 and slides in the inside of the elongated hole 45; and a pin portion which slides in the inside of the guide hole 35.

The guide hole 35 is formed so as to guide the guide projecting portion 46 upward along with the upward rotation of the connecting member 27 about the first rotation axis C1 in response to a manipulation of the manipulation lever 24 toward a side where the screen 20 is moved upward. In this embodiment, the guide hole 35 is formed such that the guide hole 35 extends in the vertical direction while being curved in a frontwardly projecting manner.

Figure 4:
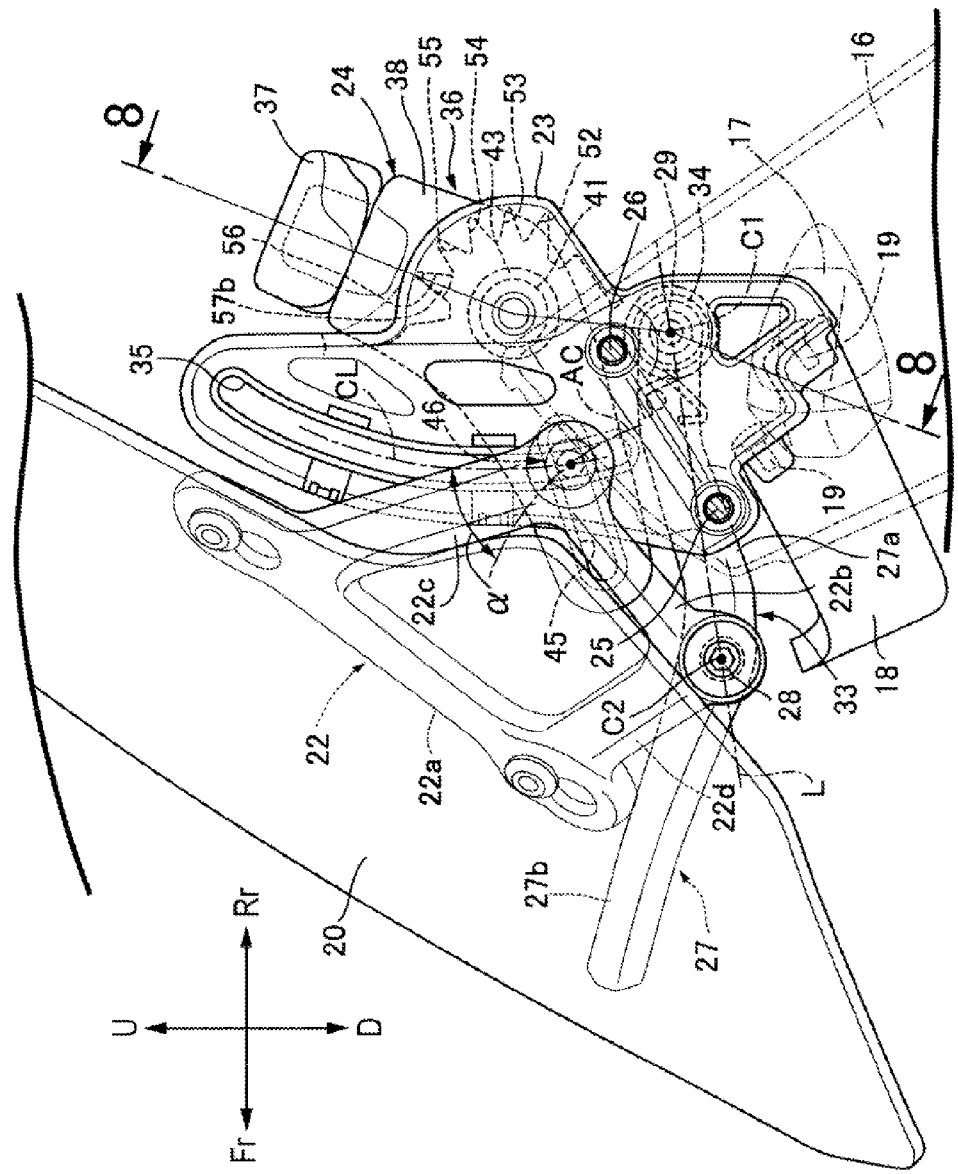
FIG. 4 is an enlarged view of an essential part of the motorcycle shown in FIG. 3.
Figure 6:
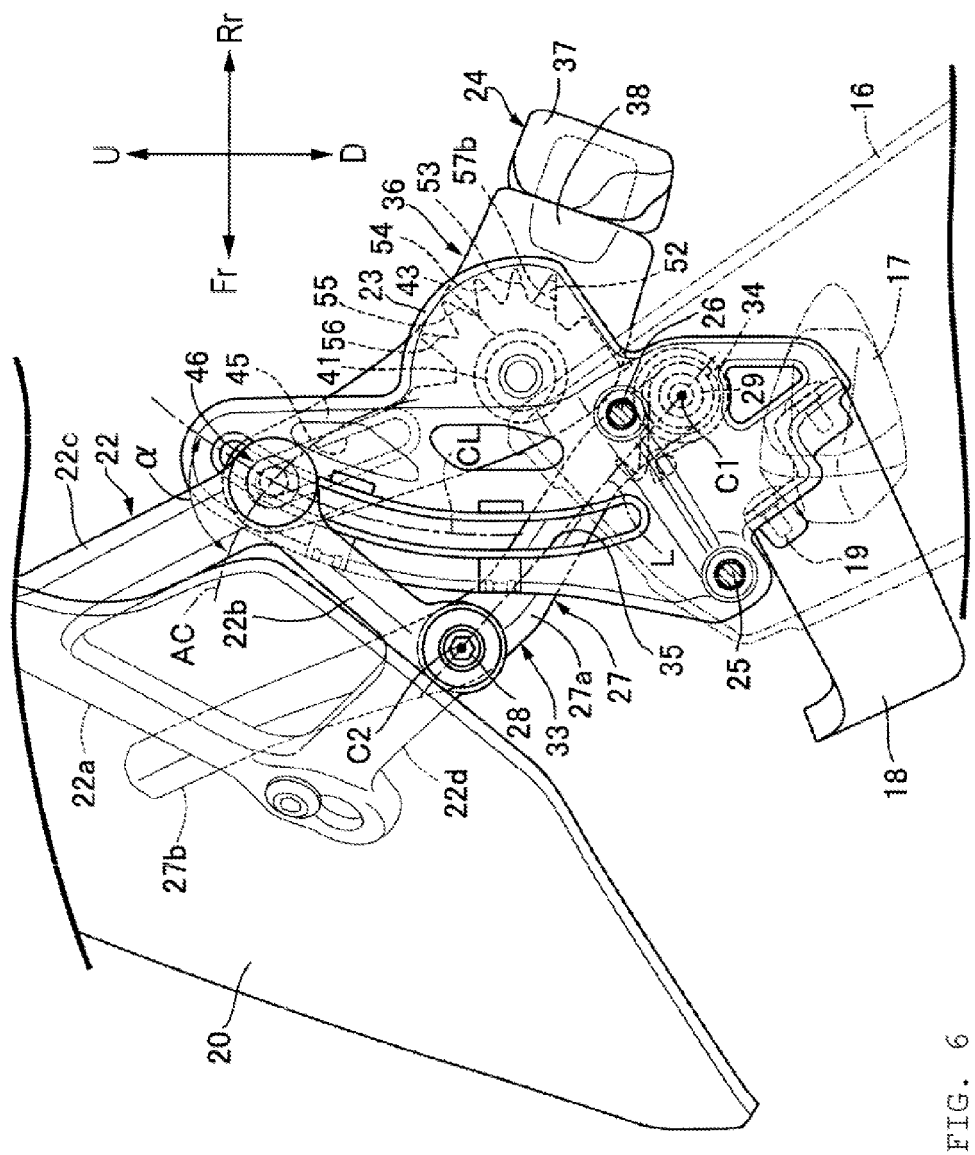
FIG. 6 is an enlarged view of an essential part of the motorcycle shown in FIG. 5.
Figure 7:
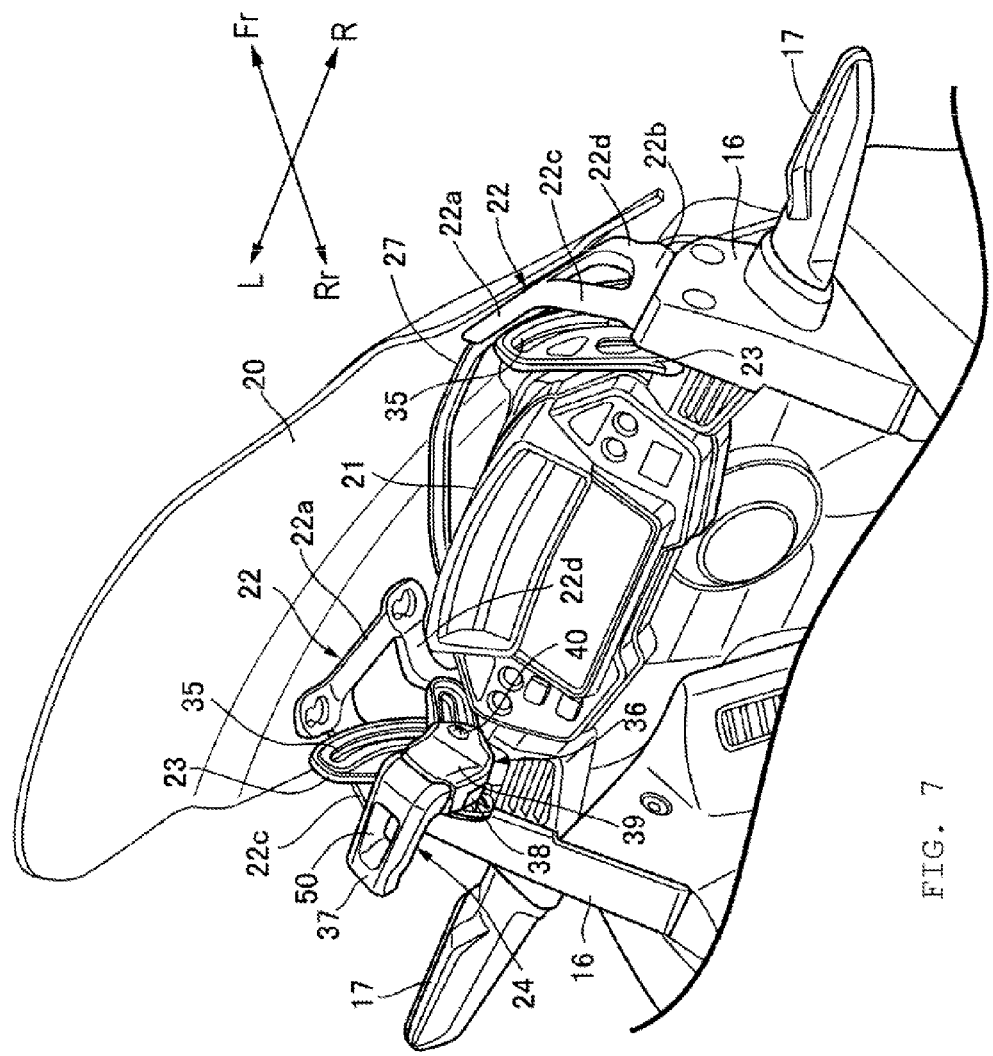
FIG. 7 is a perspective view of the essential part of the motorcycle as viewed in a direction indicated by an arrow 7 in FIG. 2.

Further, as explicitly shown in FIG. 4 and FIG. 6, the relative positions of the second rotation axis C2, the guide projecting portion 46 and the guide hole 35 are set such that a center line CL which passes the center of the guide hole 35 in the width direction and an arc AC which passes the center of the guide projecting portion 46 about the second rotation axis C2 intersect with each other at an acute angle $\alpha$ in front of and above the guide hole 35.

A pair of grip support portions 47 is formed on an end portion of the lever body 38 on a side opposite to the second bolt 26 with respect to the second boss portion 41. One end portion of the grip 37 is connected to the pair of grip support portions 47 in a rotatable manner by way of a first support pin 48 such that the grip 37 is folded toward the outside in the vehicle width direction from the lever main portion 36 at the storage position. A second torsion spring 49 which surrounds the first support pin 48 is arranged between the lever body 38 and the grip 37 so as to generate a spring force which biases the grip 37 toward a storage position side.

A wall thickness reducing hole 50 is formed in the grip 37. The relative positions of the left rail bracket 23 and the manipulation lever 24 are set such that the grip 37 at the storage position is arranged behind the left rail bracket 23.

A resilient member 51 which is resiliently brought into contact with the lever body 38 when the grip 37 is at the storage position is adhered to the grip 37.

A plurality of engaging recessed portions, five engaging recessed portions 52, 53, 54, 55, 56 in this embodiment, which individually correspond to a plurality of vertical positions of the screen 20 are mounted on a portion of the left rail bracket 23 above the second boss portion 41 at equal intervals in the circumferential direction of the second boss portion 41. On the other hand, a locking member 57 which is operated so as to selectively engage with the plurality of engaging portions 52 to 56 corresponding to the folding of the grip 37 into the storage position is housed in the inside of the lever main portion 36.

A pair of locking member support portions 58 is integrally formed on the lever body 38 between the second boss portion 41 and the grip support portion 47, and the locking member 57 is supported on the locking member support portions 58 in a rotatable manner by means of a second support pin 59.

The locking member 57 is an integral body formed of: a locking member main portion 57a which has a cylindrical shape coaxial with the second support pin 59; an engaging pawl portion 57b which projects toward the left rail bracket 23 from the locking member main portion 57a; and a pressure receiving arm portion 57c which projects from the locking member main portion 57a so as to be brought into contact with a pushing arm portion 37a integrally formed on the grip 37.

The engaging pawl portion 57b is configured such that a distal end portion of the engaging pawl portion 57b can project toward the left rail bracket 23 side through a first opening portion 60 formed in the lever body 38 and can selectively engage with the engaging recessed portions 52 to 56.

At least one of a surface of the distal end portion of the engaging pawl portion 57b of the locking member 57 which faces a respective engaging recessed portions 52 to 56 side and a surface of a portion of the rail bracket 23 corresponding to a gap formed between the neighboring engaging recessed portions among the respective engaging recessed portions 52 to 56 which faces an engaging pawl portion 57b side may be formed into an outwardly projecting curved surface for facilitating the selective engagement of the engaging pawl portion 57b with the engaging recessed portions 52 to 56.

The pushing arm portion 37a of the grip 37 is configured such that a distal end portion of the pushing arm portion 37a projects into the inside of the lever main portion 36 through a second opening portion 61 formed between the lever body 38 and the cover member 39 in the vicinity of the grip support portion 47. The pressure receiving arm portion 57c is brought into contact with the distal end portion of the pushing arm portion 37a.

A leaf spring 62 having a resilient arm portion 62a is mounted on the cover member 39. Here, the resilient arm portion 62a generates a resilient force for biasing the locking member 57 toward a side where the engaging pawl portion 57b projects to a left rail bracket 23 side through the first opening portion 60 by coming into contact with the pressure receiving arm portion 57c from a side opposite to the pushing arm portion 37a.

Figure 3:
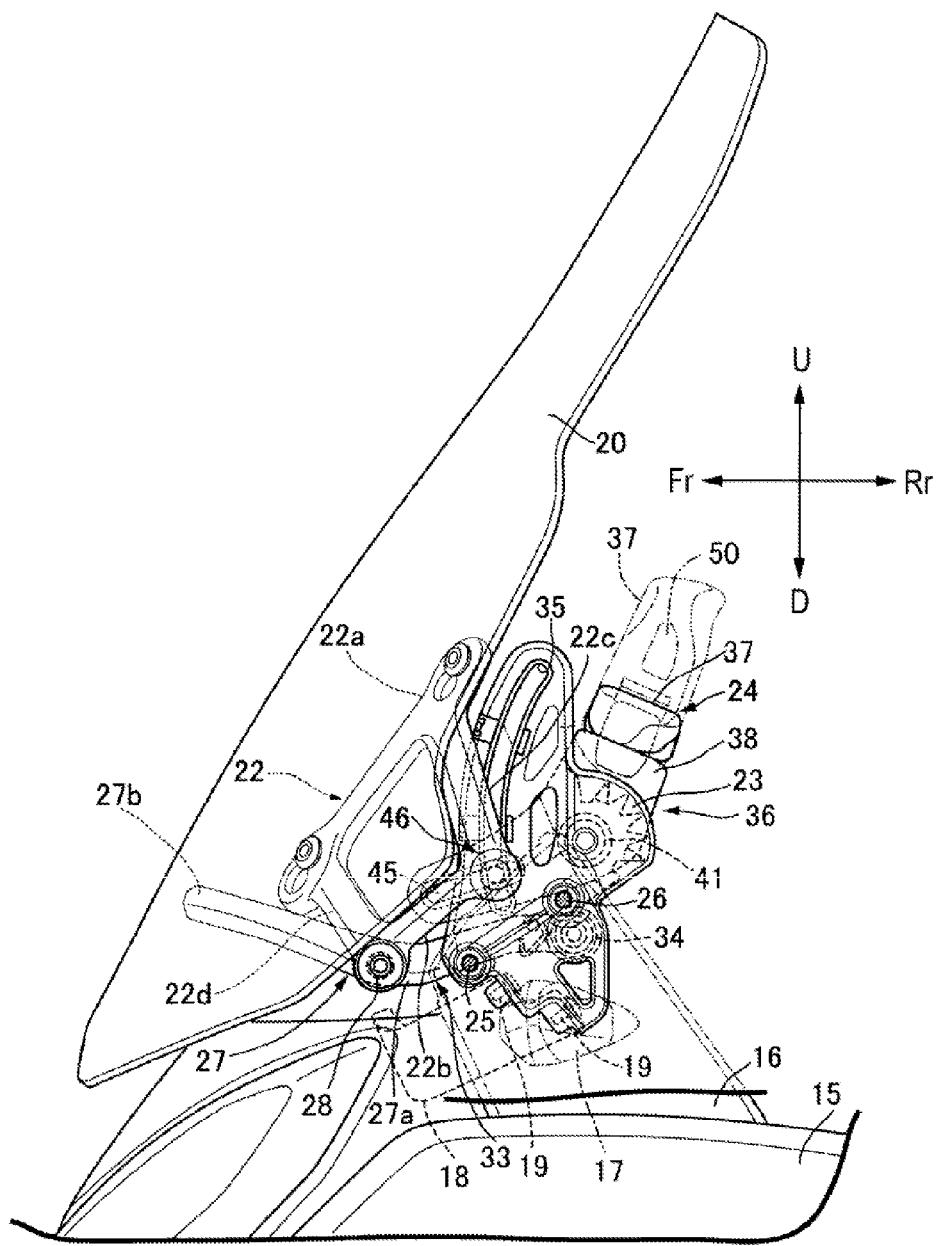
FIG. 3 is a left side view of the motorcycle as viewed in the direction indicated by an arrow 3 in FIG. 2 in a state where a screen is lowered.
Figure 5:
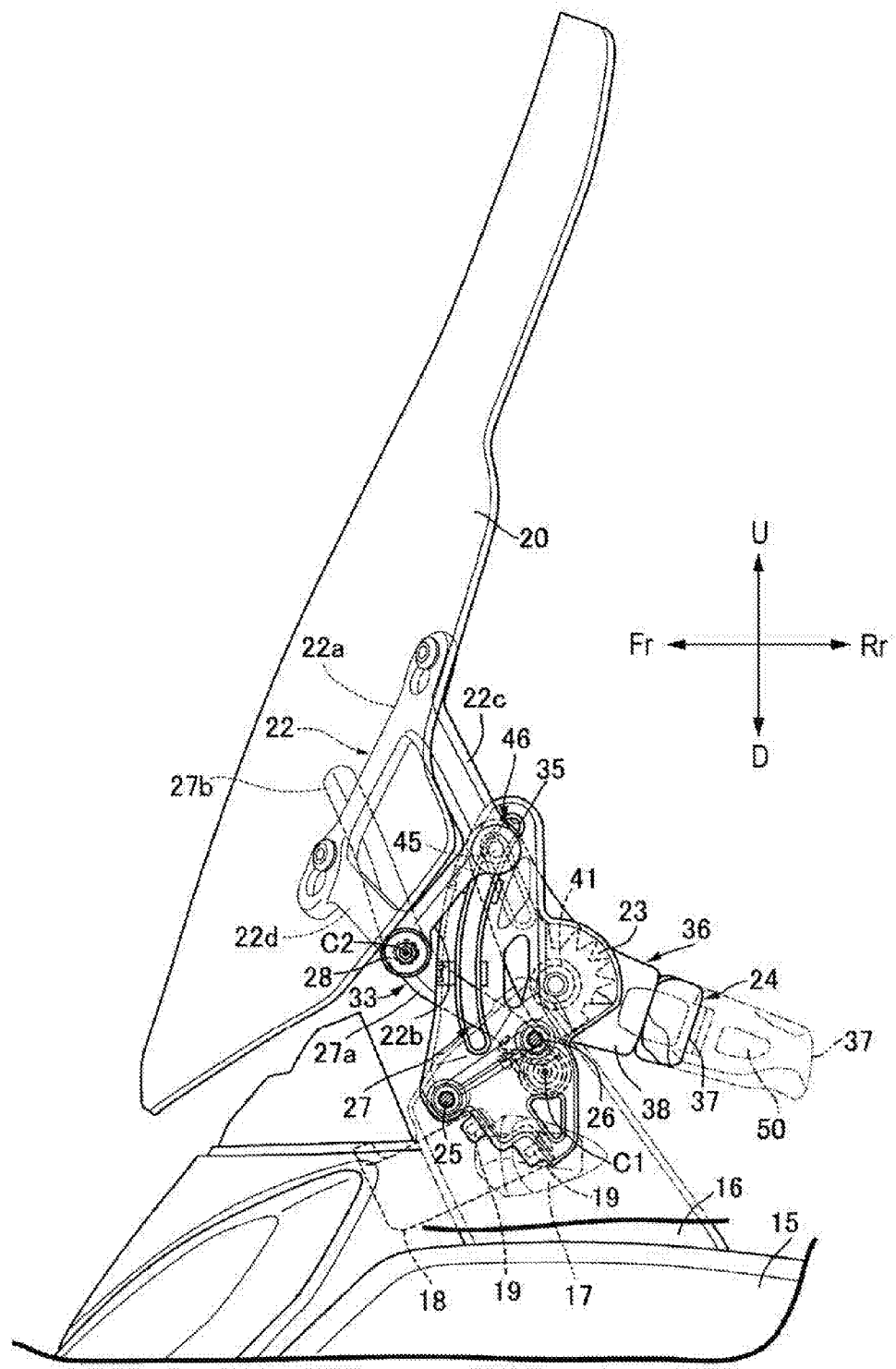
FIG. 5 is a left side view of the motorcycle corresponding to FIG. 3 in a state where the screen is elevated.
Figure 11:
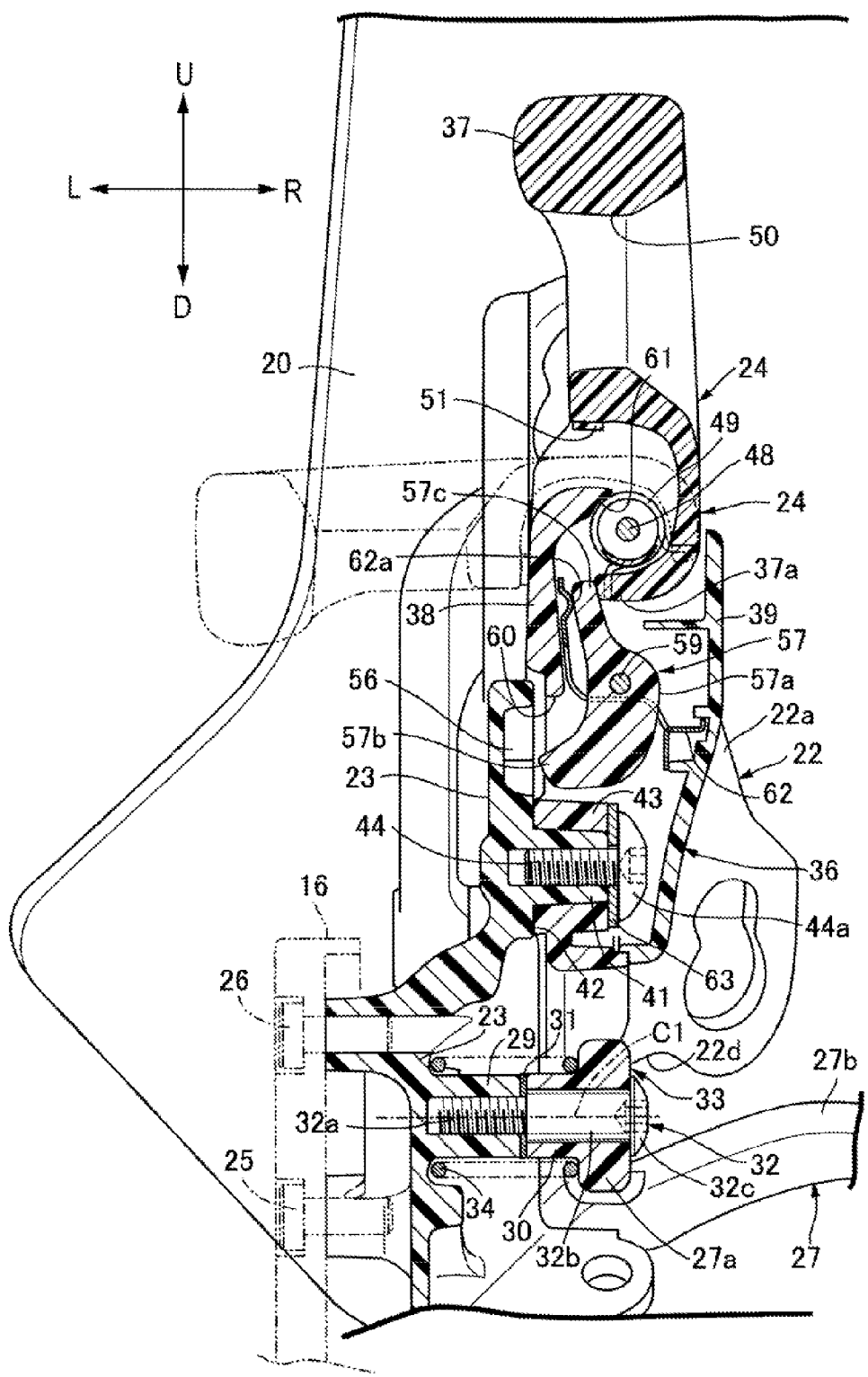
FIG. 11 is a cross-sectional view corresponding to FIG. 8 in a state where a grip is disposed at a projecting position.

As shown in FIG. 11, when the grip 37 is at the projecting position, the pressure receiving arm portion 57c is pushed by the pushing arm portion 37a and hence, the locking member 57 is rotated to a position where the selective engagement of the engaging pawl portion 57b with the engaging recessed portions 52 to 56 is released against a spring force of the leaf spring 62. By rotating the manipulation lever 24 in such a state, the screen 20 can be moved in the vertical direction within a predetermined range. In this case, the guide projecting portion 46 of the left support member 22 moves in the inside of the guide hole 35 and the elongated hole 45. When the screen 20 is moved to the lowermost position and the grip 37 is folded toward the storage position as shown in FIG. 3, FIG. 4 and FIG. 8, the engaging pawl portion 57b is engaged with the uppermost engaging recessed portion 56 so that the screen 20 is maintained at the lowermost position. When the screen 20 is moved to the uppermost position and the grip 37 is folded toward the storage position as shown in FIG. 5 and FIG. 6, the engaging pawl portion 57b is engaged with the lowermost engaging recessed portion 52 so that the screen 20 is maintained at the uppermost position.

Next, the manner of operation of the first embodiment is explained. The vertical movement of the support members 22 disposed on both left and right sides of the wind shield screen 20 are guided by the pair of left and right fixed rail brackets 23. The manipulation lever 24 which is manually operable so as to vertically move the screen 20 and is connected to at least one of the pair of support members 22 is constituted of: the lever main portion 36 which is rotatably supported on at least one of the pair of rail brackets 23 and is connected to at least one of the support members 22; and the grip 37 which is connected to the lever main portion 36 in a state where the vehicle user can grip the grip 37. The grip 37 is connected to the lever main portion 36 such that the grip 37 is operable between the projecting position where the grip 37 projects from the lever main portion 36 and the storage position where the grip 37 is folded toward a lever main portion 36 side and hence, the screen 20 is vertically moved by manipulating the relatively longer manipulation lever 24 in a state where the grip 37 assumes the projecting position and hence, a force necessary for manipulating the manipulation lever 24 can be reduced whereby the manipulating property of the manipulation lever 24 can be enhanced. Further, by folding the grip 37 to the storage position on a lever main portion 36 side after the grip 37 is manipulated so as to move the screen 20, the moving device including the manipulation lever 24 can be made compact, and the visibility of the screen 20 can be enhanced in such a folded state.

The manipulation lever 24 is supported in a rotatable manner on the left rail bracket 23 out of the pair of left and right rail brackets 23 and hence, even when the manipulation lever 24 is manipulated in a state where the steering handle 12 is steered to a left side for locking a handle bar at the time of parking, the manipulation lever 24 minimally interferes with the steering handle 12 and hence, the manipulating property of the manipulation lever 24 can be enhanced.

The meter unit 21 which displays vehicle information is arranged between the pair of left and right support-members 22, and the grip 37 is connected to the lever main portion 36 in a state where the grip 37 is folded toward the outside in the vehicle width direction from the lever main portion 36 in the storage position. Accordingly, by arranging the grip 37 at the storage position at the position where the grip 37 does not overlap with the meter unit 21, there is no possibility that a vehicle user erroneously manipulates a button arranged on the meter unit 21 at the time of manipulating the grip 37 toward a projecting position side and hence, the manipulating property of the manipulation lever 24 can be enhanced and, at the same time, the visibility of the meter unit 21 is enhanced.

Further, the link mechanism 33 which enables the connecting member 27 to be rotated by way of the support member 22 in response to the manipulation of the manipulation lever 24 is constituted of the manipulation lever 24, the support member 22 and the connecting member 27. Accordingly, by forming the guide mechanisms disposed on both sides of the screen 20 so as to guide the movement of the screen 20 and portions of the link mechanisms 33 for moving the screen 20 using the support member 22 in common, the screen 20 can be moved in the vertical direction with the simple and miniaturized structure. Further, the screen moving device has the simple structure and hence, a resistance generated by rattling of the screen 20 can be suppressed so that the screen 20 can be easily moved.

Further, the connecting member 27 which extends in the vehicle width direction and has both longitudinal end portions thereof connected to the pair of left and right-rail bracket 23 in a rotatable manner about the first rotation axis C1 is connected to the support member 22 in a rotatable manner about the second rotation axis C2 arranged in front of the first rotation axis C1 in such a manner that the support member 22 and the connecting member 27 forms the link mechanism 33. The guide projecting portion 46 which is mounted on the support member 22 in a projecting manner above the straight line L which connects the first and second rotation axes C1, C2 to each other is fitted in the guide hole 35 in a slidable manner. Accordingly, the screen 20 can be supported at two positions away from each other in the vertical direction from behind thus suppressing the generation of rattling of the screen 20 during traveling.

The guide hole 35 is formed so as to guide the guide projecting portion 46 upward along with the upward rotation of the connecting member 27 about the first rotation axis C1 in response to a manipulation of the manipulation lever 24 toward a side where the screen 20 is moved upward. Accordingly, the more upper side the screen 20 is positioned, the larger a distance between two support points, that is, upper and lower portions where the rail brackets 23 support the screen 20 from behind becomes. Accordingly, even when the screen 20 is in a state where the screen 20 is easily affected by a traveling wind, the screen 20 can be firmly held thus providing the structure where rattling of the screen 20 is minimally generated.

The relative positions of the second rotation axis C2, the guide projecting portion 46 and the guide hole 35 are set such that the center line CL which passes the center of the guide hole 35 in the width direction and the arc AC which passes the center of the guide projecting portion 46 about the second rotation axis C2 intersect with each other at an acute angle α in front of and above the guide hole 35. Accordingly, the screen 20 is supported in an inclined manner such that the guide projecting portion 46 of the support member 22 which is rotatable about the second rotation axis C2 is brought into slide contact with the side surface of the guide hole 35 and hence, the generation of rattling of the screen 20 can be suppressed more effectively.

The first torsion spring 34 which biases the screen 20 upward is disposed between the rail bracket 23 and the connecting member 27 and hence, a manipulating force necessary for moving the screen 20 upward can be reduced whereby the screen 20 can be easily moved upward with a small manipulating force.

Further, by connecting the pair of left and right support members 22 to each other using the connecting member 27, it is possible to acquire not only an advantageous effect where the screen 20 can be moved smoothly by setting the vertical positions of the left and right support members 22 at the time of moving the screen 20 upward or downward equal to each other thus enhancing the manipulating property of the screen 20 but also an advantageous effect where the screen 20 can be firmly supported by enhancing the rigidity of the support members 22. By forming the guide hole 35 having a curved shape in the rail bracket 23, the weight of the rail bracket 23 can be reduced thus contributing to the reduction of weight of the vehicle body.

The guide hole 35 formed in the rail bracket 23 is formed in an extending manner in a curved shape, the elongated hole 45 extending in a direction which intersects with the guide hole 35 is formed in the lever main portion 36, and the guide projecting portion 46 formed on the support member 22 in a projecting manner is made to pass through the guide hole 35 and the elongated hole 45. Accordingly, the screen 20 can be moved such that the screen 20 draws an appropriate trajectory without increasing a size of the manipulation lever 24 and hence, the large-sizing of the manipulation lever 24 can be suppressed whereby the moving device can be simplified.

The wall thickness reducing hole 50 is formed in the grip 37. Accordingly, a vehicle user can easily grip the grip 37 and hence, the screen 20 can be moved with a small force. A cost can be reduced by reducing an amount of resin for forming the grip 37. A weight of the manipulation lever 24 can be reduced thus contributing to the reduction of weight of the motorcycle. Further, the swirling of a traveling wind generated around the screen 20 can be suppressed thus contributing to the enhancement of riding comfort of the motorcycle.

The relative positions of the left rail bracket 23 and the manipulation lever 24 are set such that the grip 37 at the storage position is arranged behind the left rail bracket 23 and hence, the moving device including the manipulation lever 24 can be made compact and can be simplified.

The plurality of engaging recessed portions 52 to 56 which individually correspond to the plurality of vertical positions of the screen 20 are formed on one of the rail brackets 23, and the locking member 57 which is configured to selectively engage with the plurality of engaging portions 52 to 56 corresponding to the folding of the grip 37 into the storage position is housed in the inside of the lever main portion 36. Accordingly, the screen 20 can be held at an arbitrary vertical position with the compact configuration having small number of parts. Further, such a configuration is not a ratchet mechanism and hence, it is unnecessary to move the screen 20 to a predetermined position so that the screen 20 can be freely moved. Accordingly, it is possible to provide a user friendly moving device. In such a moving device, the screen 20 becomes movable only when the grip 37 assumes the projecting position and hence, the screen 20 can be moved with a small force.

Although a second embodiment of the present disclosure is explained with reference to FIG. 12 and FIG. 13, parts corresponding to the parts in the above-mentioned first embodiment are merely shown in the drawings using the same symbols in the first embodiment, and the detailed explanation of these parts is omitted.

An elongated hole 65 which extends in the direction which intersects with a guide hole 35 formed in a rail bracket 23 and having a curved shape is formed in a lever body 38 of a lever main portion 36 of a manipulation lever 24. On the other hand, a pin-shaped guide projecting portion 66 having a circular transverse cross section is formed on the support member 22 (see the first embodiment) in a projecting manner, and the guide projecting portion 66 is configured to be slidably fitted in the guide hole 35 and pass through the elongated hole 65.

Figure 12:
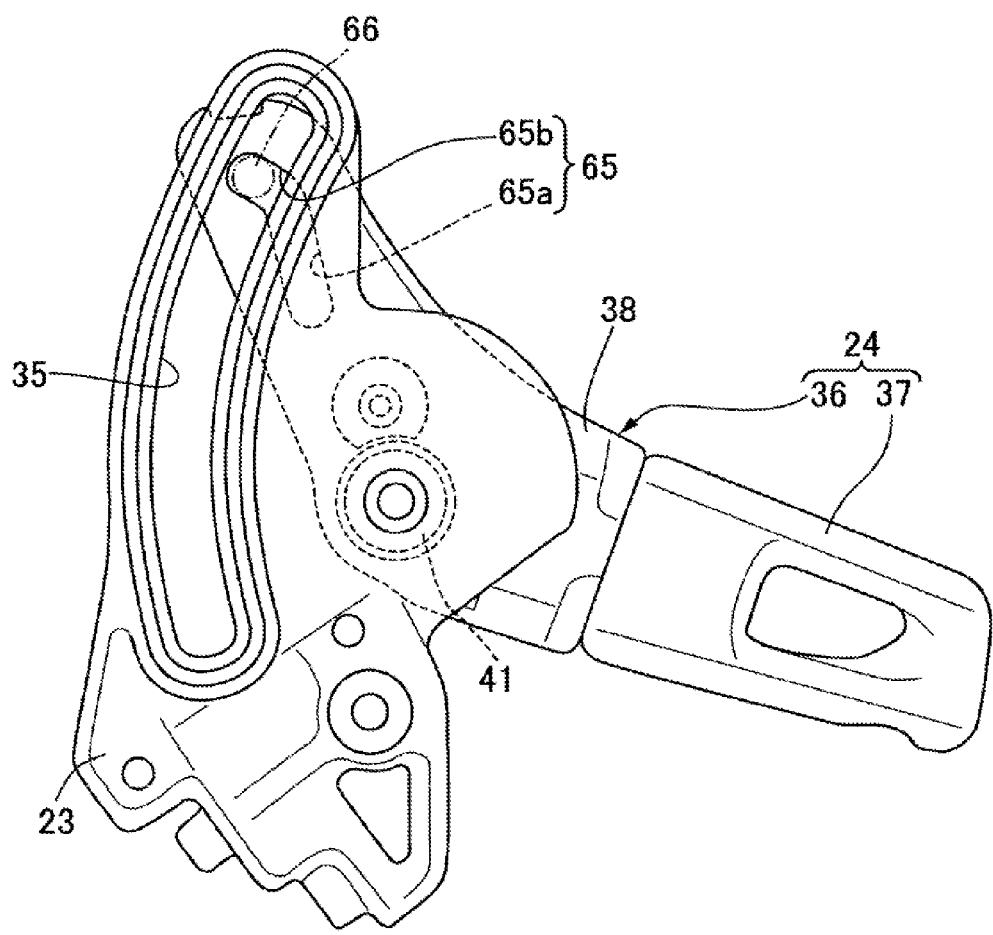
FIG. 12 is a side view showing a manipulation handle and a rail bracket according to a second embodiment.
Figure 13:
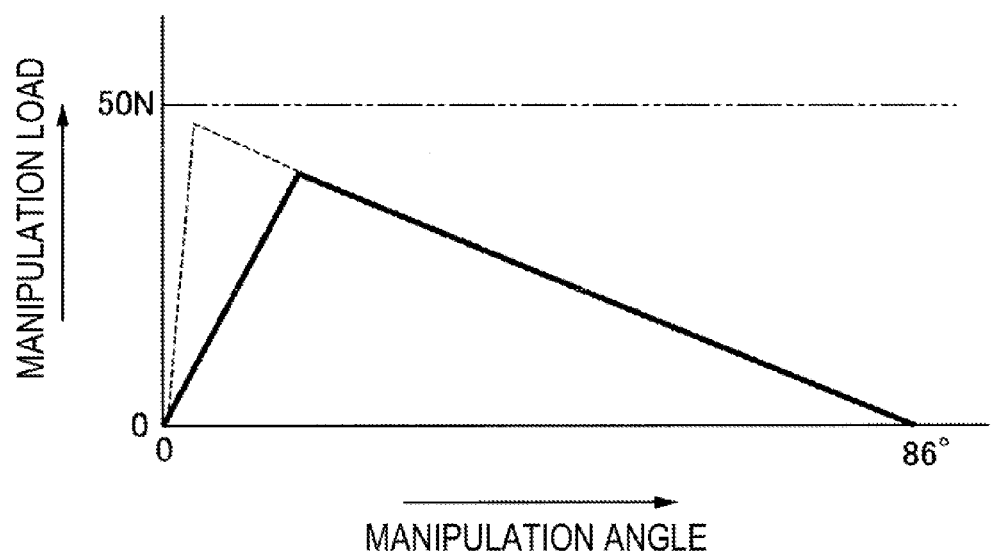
FIG. 13 is a view showing a change in a manipulation load with respect to a manipulation angle of the manipulation lever.

Unlike the elongated hole 45 formed in the lever body 38 in the first embodiment which extends linearly, the elongated hole 65 formed in the lever body 38 in the second embodiment is formed of: a lower elongated hole portion 65a which extends in the vertical direction in a state shown in FIG. 12 where the manipulation lever 24 is rotated downward so as to elevate a screen 20 to an uppermost position (see the first embodiment); and an upper elongated hole portion 65b which is bent from an upper end of the lower elongated hole portion 65a and extends in the direction approximately orthogonal to the guide hole 35.

When the screen 20 is lowered by rotatably manipulating the manipulation lever 24 having such an elongated hole 65 upward, at an initial stage of such a manipulation, a force acts on the guide projecting portion 66 in the direction along the guide hole 35 from the lever body 38. Accordingly, as indicated by a solid line in FIG. 13, an initial load rises gently so that feeling of manipulation is improved. On the other hand, as in the case of the first embodiment where the elongated hole 45 extends linearly, at an initial stage of such a manipulation, a force acts on the guide projecting portion 66 in the direction that the guide projecting portion 66 is pushed to the side surface of the guide hole 35 from the lever body 38. Accordingly, as indicated by a chain line in FIG. 13, an initial load rises sharply thus giving rise to a possibility that feeling of manipulation is deteriorated.

Although the embodiments of the present disclosure have been explained heretofore, the invention is not limited to the above-mentioned embodiments, and various modifications on design are conceivable without departing from the invention described in claims.

For example, the manipulation lever 24 may be arranged on a right side in the vehicle width direction, and the grip 37 may be folded toward the inside in the vehicle width direction.

The manipulation lever 24 may be arranged on both left and right sides in the vehicle width direction. In this case, the screen 20 is moved in a state where the screen 20 is supported on both left and right sides and hence, compared to the case where the screen 20 is moved on one side, the screen 20 moves uniformly with respect to the left and right rail brackets 23 whereby it is possible to suppress rattling of the screen 20 with respect to the rail brackets 23.

In the above-mentioned embodiments, the manipulation lever 24 is configured to be rotatable when the grip 37 is at the projecting position, and vertical positions of the manipulation lever 24 and the screen 20 are held by the selective engagement of the locking member 57 with the plurality of engaging recessed portions 52 to 56 formed on the rail bracket 23 when the grip 37 is folded to the storage position. However, reversely, the manipulation lever 24 may be configured such that the manipulation lever 24 is not rotatable when the grip 37 is at the projecting position and the manipulation lever 24 is rotatable when the grip 37 is folded to the storage position.

Further, the present disclosure is widely applicable not only to the motorcycle but also to a saddle-ride-type vehicle such as a three-wheeled vehicle.

The invention claimed is:

1. A screen moving device in a saddle-ride-type vehicle comprising a wind shield screen arranged in front of a steering handle in a vertically movable manner, the screen moving device comprising:

support members disposed on both left and right sides of the screen respectively with respect to a longitudinal direction of the vehicle;

a pair of left and right fixed rail brackets provided for guiding the support members in a vertically movable manner; and a manipulation lever connected to at least one of the pair of support members so as to enable a manual manipulation which moves the screen vertically, wherein the manipulation lever comprises:

a lever main portion which is rotatably supported on at least one of the pair of rail brackets and is connected to at least one of the support members;

a grip which is connected to the lever main portion and is capable of being gripped by a vehicle user;

a connecting member connecting the pair of left and right support members, wherein both end portions of the connecting member are rotatably connected to the pair of left and right rail brackets respectively, a guide hole which guides the support members along a moving trajectory of the screen is formed in the rail bracket, and a screen biasing spring which biases the screen upward is disposed between the rail bracket and the connecting member, and wherein the grip is connected to the lever main portion in a state where the grip is operable between a projecting position where the grip projects from the lever main portion and a storage position where the grip is folded toward a lever main portion side.

2. The screen moving device in a saddle-ride-type vehicle according to claim 1, wherein the manipulation lever is rotatably supported on the left rail bracket out of the pair of left and right rail brackets.

3. The screen moving device in a saddle-ride-type vehicle according to claim 1, wherein a meter unit which displays vehicle information is arranged between the pair of left and right support members, and the grip is connected to the lever main portion in a state where the grip is folded toward an outside in a vehicle width direction from the lever main portion in the storage position.

4. The screen moving device in a saddle-ride-type vehicle according to claim 1, wherein the guide hole formed in the rail bracket is formed in an extending manner in a curved shape, an elongated hole extending in a direction which intersects with the guide hole is formed in the lever main portion, and a guide projecting portion formed on the support member in a projecting manner is configured to pass through the guide hole and the elongated hole.

5. The screen moving device in a saddle-ride-type vehicle according to claim 1, wherein a wall thickness reducing hole is formed in the grip.

6. The screen moving device in a saddle-ride-type vehicle according to claim 1, wherein relative positions of the rail bracket and the manipulation lever are set such that the grip disposed at the storage position is arranged behind at least one of the rail brackets.

7. The screen moving device in a saddle-ride-type vehicle according to claim 1, wherein a plurality of engaging recessed portions individually corresponding to a plurality of vertical positions of the screen are formed on at least one of the rail brackets, and a locking member which is configured to selectively engage with the plurality of engaging portions corresponding to folding of the grip into the storage position is housed in the inside of the lever main portion.

8. The screen moving device in a saddle-ride-type vehicle according to claim 1, wherein, in the projecting position, the grip extends in a lengthwise direction of the lever main portion, and, in the storage position, the grip is inclined in a direction intersecting the lengthwise direction of the lever main portion.

9. The screen moving device in a saddle-ride-type vehicle according to claim 8, wherein the manipulation lever further comprises a locking mechanism configured to prevent rotation movement of the manipulation lever with respect to the rail bracket when the grip is in the storage position and enable the rotation movement of the manipulation lever when the grip is in the projecting position.

10. The screen moving device in a saddle-ride-type vehicle according to claim 8, wherein the grip is pivotably connected to the lever main portion.

11. The screen moving device in a saddle-ride-type vehicle according to claim 1, wherein the screen is fixed to the support members, and rotation movement of the manipulation lever with respect to the rail bracket moves the support members vertically.

12. A screen moving device in a saddle-ride-type vehicle comprising a wind shield screen arranged in front of a steering handle in a vertically movable manner, the screen moving device comprising:

support members disposed on both left and right sides of the screen respectively with respect to a longitudinal direction of the vehicle;

a pair of left and right fixed rail brackets provided for guiding the support members in a vertically movable manner; and a manipulation lever connected to at least one of the pair of support members so as to enable a manual manipulation which moves the screen vertically, wherein the manipulation lever comprises:

a lever main portion which is rotatably supported on at least one of the pair of rail brackets and is connected to at least one of the support members; and a grip which is connected to the lever main portion and is capable of being gripped by a vehicle user, wherein the grip is connected to the lever main portion in a state where the grip is operable between a projecting position where the grip projects from the lever main portion and a storage position where the grip is folded toward a lever main portion side, and wherein a plurality of engaging recessed portions individually corresponding to a plurality of vertical positions of the screen are formed on at least one of the rail brackets, and a locking member which is configured to selectively engage with the plurality of engaging portions corresponding to folding of the grip into the storage position is housed in the inside of the lever main portion.

13. A screen moving device in a saddle-ride-type vehicle comprising a wind shield screen arranged in front of a steering handle in a vertically movable manner, the screen moving device comprising:

support members disposed on both left and right sides of the screen respectively with respect to a longitudinal direction of the vehicle;

a pair of left and right fixed rail brackets provided for guiding the support members in a vertically movable manner; and a manipulation lever connected to at least one of the pair of support members so as to enable a manual manipulation which moves the screen vertically, wherein the manipulation lever comprises:

a lever main portion which is rotatably supported on at least one of the pair of rail brackets and is connected to at least one of the support members; and a grip which is connected to the lever main portion and is capable of being gripped by a vehicle user, wherein the grip is connected to the lever main portion in a state where the grip is operable between a projecting position where the grip projects from the lever main portion and a storage position where the grip is folded toward a lever main portion side, wherein, in the projecting position, the grip extends in a lengthwise direction of the lever main portion, and, in the storage position, the grip is inclined in a direction intersecting the lengthwise direction of the lever main portion, and wherein the grip is pivotably connected to the lever main portion.

* * * * *